US012612959B1

(12) United States Patent
Barbeito

(10) Patent No.: US 12,612,959 B1
(45) Date of Patent: Apr. 28, 2026

(54) APPARATUS FOR CONVERTING ROTATIONAL MOTION TO LINEAR MOTION

(71) Applicant: Arturo Manuel Barbeito, Miami, FL (US)

(72) Inventor: Arturo Manuel Barbeito, Miami, FL (US)

( * ) Notice: Subject to any disclaimer, the term of this patent is extended or adjusted under 35 U.S.C. 154(b) by 0 days.

(21) Appl. No.: 19/258,183

(22) Filed: Jul. 2, 2025

(51) Int. Cl.
| | |
|---|---|
| *F16H 19/04* | (2006.01) |
| *F16H 21/40* | (2006.01) |
| *H02K 7/065* | (2006.01) |

(52) U.S. Cl.
CPC ........... *F16H 19/043* (2013.01); *F16H 21/40* (2013.01); *H02K 7/065* (2013.01)

(58) Field of Classification Search
CPC ........ F16H 19/043; F16H 21/40; H02K 7/065
See application file for complete search history.

(56) References Cited

U.S. PATENT DOCUMENTS

| | | | | |
|---|---|---|---|---|
| 3,590,651 | A | * | 7/1971 | Vallieres ................. F16H 3/145 74/404 |
| 4,586,868 | A | * | 5/1986 | Nakashima .......... B25J 17/0283 901/29 |
| 4,630,992 | A | * | 12/1986 | Gilli ........................ B25J 18/02 901/17 |
| 2025/0162710 | A1 | * | 5/2025 | Frissora ................. B64U 30/24 |

* cited by examiner

*Primary Examiner* — Terence Boes
(74) *Attorney, Agent, or Firm* — The Concept Law Group, PA; Scott D. Smiley; Scott M. Garrett

(57) ABSTRACT

A coaxial shaft is coupled to a platform that rolls or glides on a track. The coaxial shaft has two components which rotate in opposite directions from each other so that two rotation members can be rotated in opposite directions (clockwise and counter-clockwise). This rotation generates outward forces in each rotational member, which are summed so that the force components perpendicular to the track cancel each other out, and the force components parallel to the track constructively sum to produce and oscillation of the platform along the track. This oscillation can be used by a linear generator to produce a time-varying voltage output.

15 Claims, 13 Drawing Sheets

<u>100</u>

APPARATUS FOR CONVERTING ROTATIONAL MOTION TO LINEAR MOTION

FIELD OF THE INVENTION

The present invention relates generally to scientific and educational devices for studying the effects of forces, and, more particularly, relates to an apparatus that uses counter-rotating masses to create a linear oscillation, where the various parameters of mass, rotational radius, rotational speed, and rotational speed variation can be adjusted to determine the effects on the efficiency of power conversion.

BACKGROUND OF THE INVENTION

There are many examples of mechanical systems were rotational, semi-periodic motion is converted to linear recip-rocation. Applications of this conversion include, for example, power generation systems such as wave power, control systems such as in marine vessel stabilizing systems, and many other industrial and scientific applications. In the development of such applications, there is a need to study and test various conditions under which such systems may operate, in order to characterize, for example efficiency and losses, and the effect of non-linearities and other variables. Unfortunately, there is a lack of such study and test appa-ratuses for use in industry.

Therefore, a need exists to overcome the problems with the prior art as discussed above.

SUMMARY OF THE INVENTION

In accordance with some embodiments of the inventive disclosure, there is provided an apparatus for converting rotation motion to linear motion, including a base having a pair of rails that are parallel to each other. There is a longitudinal axis defined midway between the rails and parallel to the rails. There is a platform mounted on the pair of rails that is configured to roll freely along the pair of rails. There is a coaxial shaft extending from the platform, cen-tered over the longitudinal axis, and which has a first portion that rotates in a first direction and a second portion that extends above the first portion that rotates in a second direction that is opposite of the first direction. There is a first boom coupled to the first portion of the coaxial shaft and having a first boom mass, and a second boom coupled to the second portion of the coaxial shaft and having a second boom mass. Upon applying a rotational drive to the coaxial shaft, the first boom is rotated about the coaxial shaft in the first direction and the second boom is rotated about the coaxial shaft in the second direction in synchronization such that rotation of the first boom and rotation of the second boom meet on the longitudinal axis. Rotation of the first and second booms causes linear oscillation of the platform on the pair of rails.

In accordance with a further feature, there is further included at least one electromagnetic coil mounted on the base, and a magnet mounted on the platform in proximity to the at least one electromagnetic coil, wherein the linear oscillation of the platform thereby induces an electric volt-age in the at least one electromagnetic coil.

In accordance with a further feature, the at least one electromagnetic coil comprises a flat electromagnetic coil.

In accordance with a further feature, the coaxial shaft is configured to couple to an external rotational drive source to receive the rotational drive.

In accordance with a further feature, the platform further includes a motor that is coupled to the coaxial shaft to provide the rotational drive.

In accordance with a further feature, each of the first boom and the second boom comprise a block mass that can be positioned and fixed along each of the first boom and second boom at selected distances from the coaxial shaft, respectively.

In accordance with a further feature, there is further provided, at each of a first end and a second end of each rail of the pair of rails, a stop block.

In accordance with some embodiments of the inventive disclosure, there is provided an apparatus for converting rotation motion to linear motion that has a base having a pair of rails that are parallel to each other. There is a longitudinal axis defined midway between the rails and parallel to the rails. There is a platform mounted on the pair of rails and configured to roll freely along the pair of rails, and a coaxial shaft extending from the platform centered over the longi-tudinal axis. The coaxial shaft has a first portion that rotates in a first direction and a second portion that extends above the first portion that rotates in a second direction that is opposite of the first direction. There is a first rotating member coupled to the first portion of the coaxial shaft and having a center of mass located a radial distance from the coaxial shaft, and a second rotating member coupled to the second portion of the coaxial shaft and having a center of mass located the radial distance from the coaxial shaft. When a rotational drive is applied to the coaxial shaft the first rotating member rotates in the first direction about the coaxial shaft and the second rotational member rotates in the second direction about the coaxial shaft. Rotation of the first rotating member in the first direction and rotation of the second rotating member in the second direction generate centripetal forces that sum (constructively) in a direction along the longitudinal axis and cancel each other in a direction perpendicular to the longitudinal axis, thereby causing reciprocal oscillation of the platform along the pair of rails.

In accordance with a further feature, the first rotating member is a first boom that extends radially from the coaxial shaft, and the second rotating member is a second boom that extends radially from the coaxial shaft.

In accordance with a further feature, each of the first boom and the second boom comprise a block mass that can be positioned and fixed along each of the first boom and second boom at selected distances from the coaxial shaft, respectively.

In accordance with some embodiments of the inventive disclosure, there is provided a method of operating an apparatus for converting rotation motion to linear motion. The method includes providing a base having a pair of rails that are parallel to each other that define a longitudinal axis midway between the rails and parallel to the rails. The method also includes providing a platform mounted on the pair of rails and configured to roll freely along the pair of rails. The method also includes providing a coaxial shaft extending from the platform centered over the longitudinal axis, The coaxial shaft has a first portion that rotates in a first direction and a second portion that extends above the first portion that rotates in a second direction that is opposite of the first direction. The method further includes providing a first rotating member coupled to the first portion of the coaxial shaft that has a center of mass located a radial distance from the coaxial shaft, and providing a second rotating member coupled to the second portion of the coaxial shaft that has a center of mass located the radial distance from the coaxial shaft. The method also includes providing a rotational force to the coaxial shaft, thereby causing the first rotational member to rotate about the coaxial shaft in the first direction, and causing the second rotational member to rotate in the second direction. Responsive to providing the rotational force, the first rotational member and the second rotational member together generate centripetal forces that sum in a direction along the longitudinal axis and cancel each other in a direction perpendicular to the longitudinal axis, thereby causing the platform to reciprocate along the pair of rails.

Although the invention is illustrated and described herein as embodied in an apparatus for converting rotational motion to linear motion, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down," "left," "right," "inside," "outside," "front," "back," "head," "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first," "second," "third," and so on are only used for descriptive purposes and cannot be construed as indicating or implying relative importance.

In the description of the embodiments of the present invention, it should be noted that, unless otherwise clearly defined and limited, terms such as "installed," "coupled," "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances, these terms may include numbers that are rounded to the nearest significant figure. In this document, the term "longitudinal" should be understood to mean in a direction corresponding to an elongated direction of the article being referenced. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequences of instructions designed for execution on a computer system. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
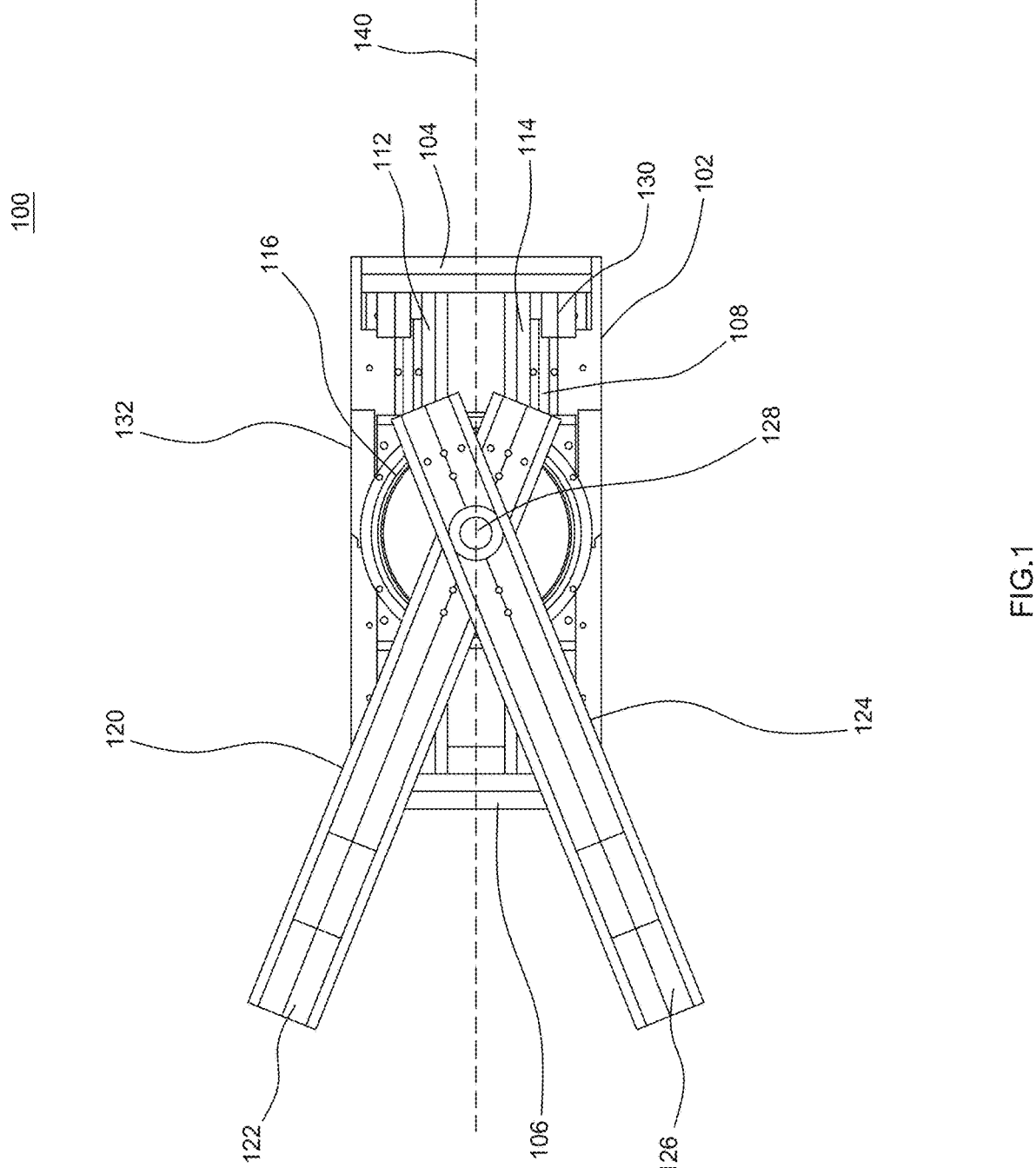
FIG. 1 is a top plan view of an apparatus for converting rotational motion to linear motion, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient apparatus that converts rotational motion or a rotational-based drive to a reciprocating linear motion, with balanced forces that eliminate undesirable torque in the system. Embodiments of the invention provide a pair of counterrotating members that are driven by an external rotational force. The centripetal forces of these counterrotating members sum to leave only forces that reciprocate along a line. This resulting linear reciprocation cam be used to drive other equipment that requires linear reciprocation, including, for example, a linear electric generator.

Figure 2:
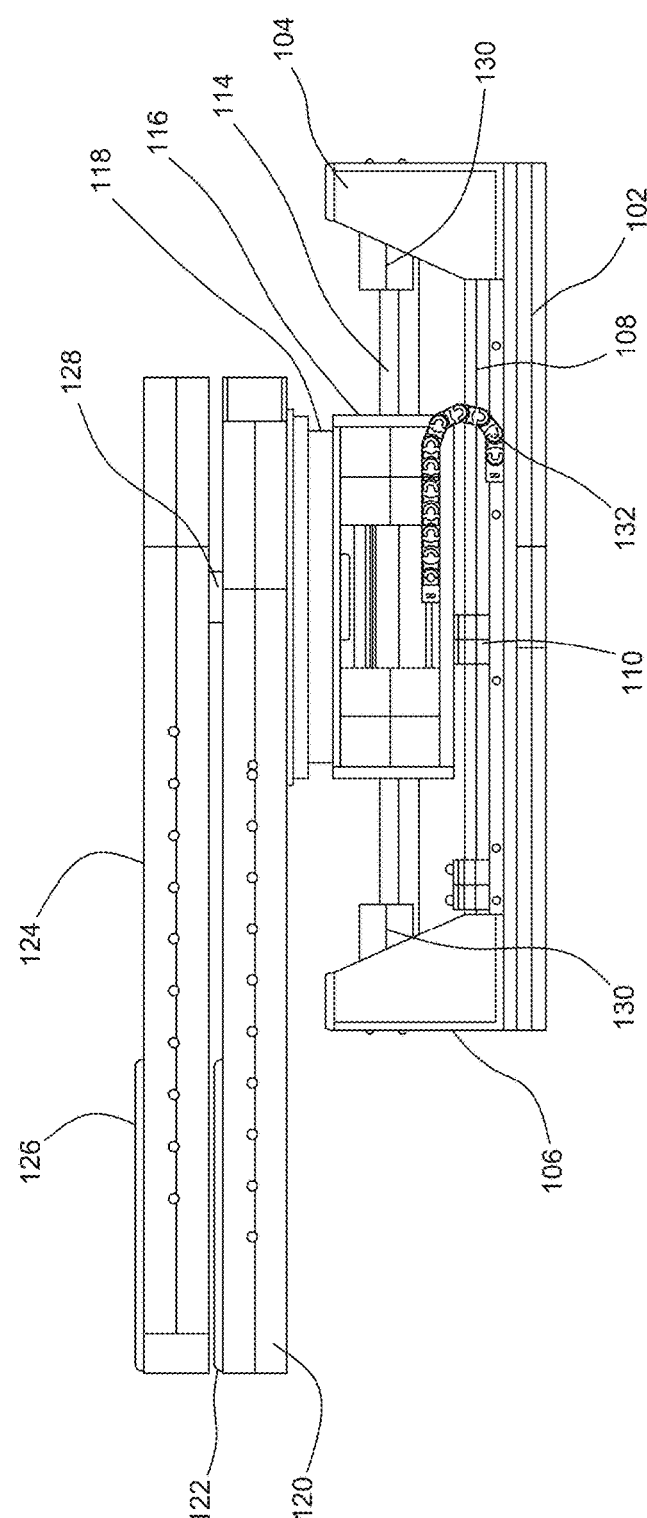
FIG. 2 is a side elevational view thereof.
Figure 3:
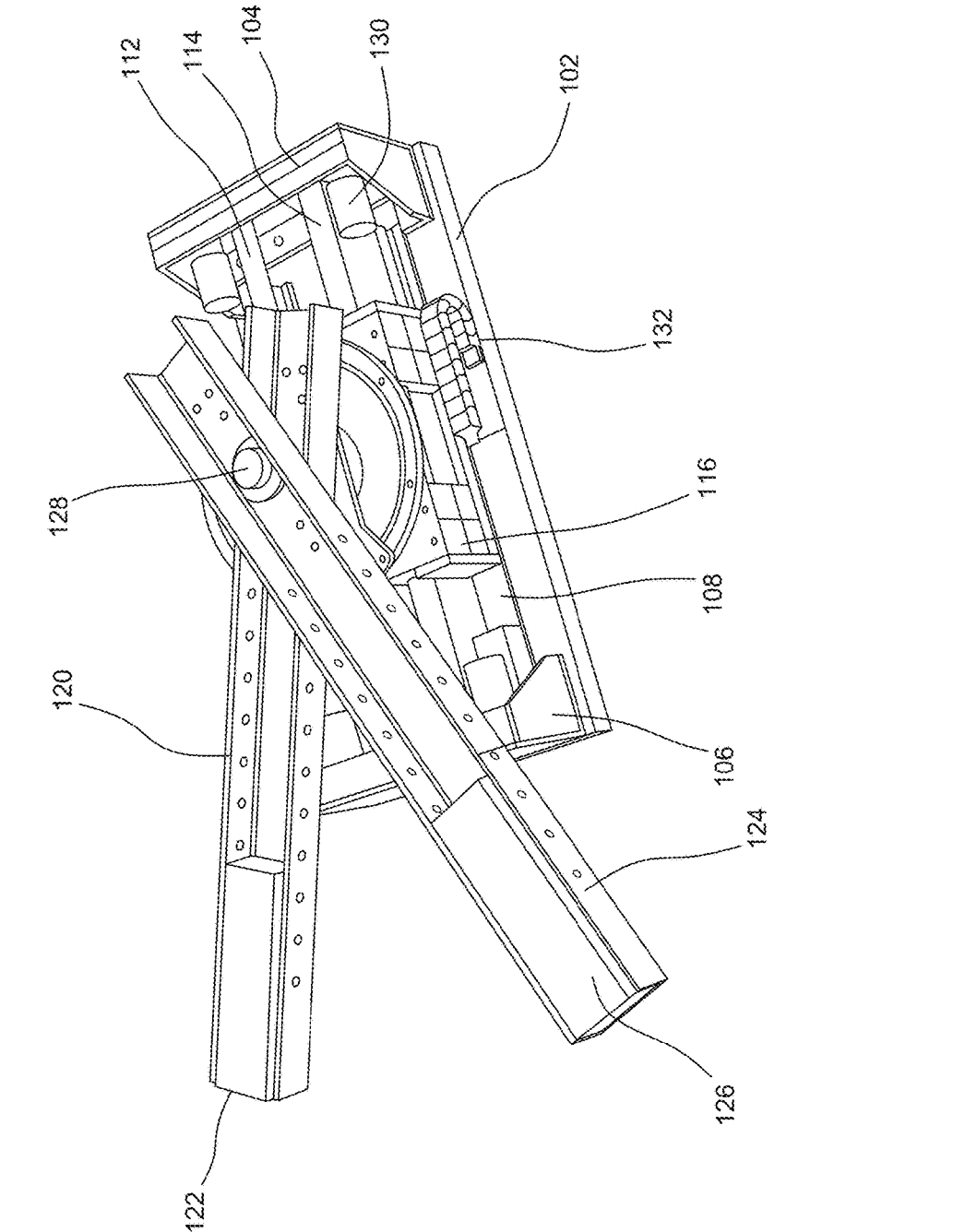
FIG. 3 is a perspective view thereof.

FIG. 1 is a top plan view of an exemplary apparatus 100 for converting rotational motion to linear motion, in accordance with some embodiments. FIGS. 2 and 3 show side elevational and perspective views of the apparatus 100. Initially here the structure and parts of the apparatus will be described, and then the operation and function will be described. The apparatus is intended as a research and development tool for evaluating and testing various conditions that can occur in forms of power generation and control, as well as for purely educational purposes.

The apparatus 100 includes a base 102 that can be mounted on a surface to hold the apparatus 100 in place during operation. The base is generally rectangular having an elongated direction along which a linear generator 116 will reciprocate. There are opposing end walls 104, 106 at the respective ends of the base. These end walls 104, 106 provide the vertical structure to support the rails 112, 114 between the wall 104, 106, as well as the stop blocks or barriers 130 that act as firm cushions to prevent damage to the apparatus, as will be explained. Along the base, and parallel to the rails 112, 114 are tracks such as track 108. The tracks guide the linear movement of a generator platform 116. The generator platform 116 is able to move back and forth along the tracks 108, and along the rails 112, 114. In some embodiments, the rails 112, 114 can also act as tracks, providing linear guidance for the generator platform 116. The rails 112, 114 can contain electromagnetic coils. The generator platform 116 can contain magnets in proximity to the coils of the rails 112, 114 so that when the generator platform moves along the rails 112, 114, an electric current can be generated. Further, the coils can be used to dampen oscillatory reciprocation, as will be explained. There are articulating guides 132 that house wiring from the base 102 into the generator platform 116. The guides 132 can be segmented or flexible guides in which wiring is routed to ensure that the wiring doesn't get caught on other parts of the apparatus 100. On top of the generator platform 116 there is a gear housing 118 in which there is a vertical coaxial shaft assembly 128. The shaft assembly 128 incudes counter-rotating shaft elements that are disposed on a common axis but which rotate in opposite directions to counter rotate first and second rotational members. The coaxial shaft is configured to couple to some rotational drive source, such as, for example, a shaft driven by a wind rotor, a motor, or another other rotational force. The rotational members each have a center of mass that is offset from the coaxial shaft. As a result, when the rotational members are rotated, they each produce centripetal forces radially from the coaxial shaft. However, the rotational members are substantially identical, in terms of their moment of inertia about the coaxial shaft, and they are rotated in synchronization so that their centripetal force components that are perpendicular to the axis of the rails cancel out, while the centripetal force components in the direction of the rails from each of the rotational members sum to generate linear forces that cause the platform to move along the rails. Since this summed centripetal force oscillates in direction and magnitude, the result is that the platform reciprocally oscillates on the rails. The rotational members can be plates that not centered on the coaxial shaft, or arms/booms that extend outward from the coaxial shaft, or any other equivalent member that can be rotated about the shaft to produce centripetal force about the coaxial shaft. It is contemplated that a single rotational member can be used, but system must be designed to account for the unbalanced forces that are perpendicular to the direction of linear oscillation.

A first arm 120 is mounted on a first shaft element, and a second arm 124 is mounted on a second shaft element. As the first and second shaft elements rotate in opposite directions, the arms 120, 124 rotate about the shaft assembly 128 in opposite directions. For example, in the top plan view of FIG. 1, one arm 120 can rotate in a clockwise direction, while arm 124 can rotate in a counter-clockwise direction, or vice-versa. The arms 120, 124 are attached to their respective shaft elements at one end of the arm, and are oriented such that their respective rotations meet at the central longitudinal axis 140 of the apparatus as they rotate, twice, meeting once on each side of the apparatus. As used here the term "meet" or "meeting" means that the arms 120, 124 are parallel to each other, on the same side of the apparatus 100, and parallel to the longitudinal axis 140 through the center of the apparatus in the elongated direction. The arms 120, 124 do not physically meet or make contact. The shaft assembly 128 is configured so that one portion of the shaft assembly, the one that arm 120 is mounted on, for example, allows the arm 120 to be positioned below the other arm 124, so that each arm 120, 124 has its own plane of rotation. During rotation, when arm 120 is, for example, perpendicular to the longitudinal axis 140, then arm 124 will also be perpendicular to the axis 140, and extending in the opposite direction from arm 120. This orientation also occurs twice per rotation.

Each of the arms 120, 124, being attached at one end of the arm to the shaft assembly 128 and extending outward, away from the shaft assembly 128, establish a moment of inertia around the shaft assembly 128, producing centripetal force when rotated. The amount of this force will vary with the mass of the arms. 120, 124, the length of the arms 120, 124, and the rate of rotation. To allow for further variability in these conditions, each arm 120, 124 is capable of holding a boom mass 122, 126, respectively, which be each be a block mass (e.g. a block). The mass 122, 126 can be mounted along its respective arm 120, 124 at various positions along the arm 120, 124, meaning at selected distance from the center of rotation at the shaft assembly 128. The masses 122, 126 can be mounted using, for example, cross pins that pass-through sides of the arms 120, 124, and the masses 122, 126 at holes along the arms 120, 124.

As the arms 120, 124 are rotated they produce a reciprocating force that acts on the generator platform 116, causing the generator platform 116 to reciprocate along the longitudinal axis 140 on the rails 114, and as supported on the tracks 108, if present. The forces created by each of the arms 120, 124 sum along the longitudinal axis, and their force components perpendicular to the axis 140 cancel each other out, assuming they are both effectively identically configured. As the arms 120, 124 rotate, the generator platform 116 responds by moving the opposite direction along the axis 140. Thus, when both arms 120, 124 pass over the longitudinal axis 140 over side wall 104, the generator platform is closest to side wall 106. When the arms 120, 124 are further rotated, and meet over wall 106, the generator platform will be closest to wall 104 of its reciprocation.

The drive to rotate the arms 120, 124 can come from either an internal motor, mounted in the generator platform, and coupled to the gearing of the shaft assembly 128, or alternatively a flexible coupling can be connected to the shaft assembly 128 to link it to an external drive source, such as, for example, a wind-driven rotor. For certain experiments and studies, however, an internal motor may be preferable because it allows both control over the rotational rate (e.g. revolutions per minute) as well as phase control throughout each revolution, thereby allowing deviation from a standard sinusoidal motion. That is, a motor can advance and retard rotation within each revolution, rather than maintain a constant rotational rate throughout each revolution.

Figure 4:
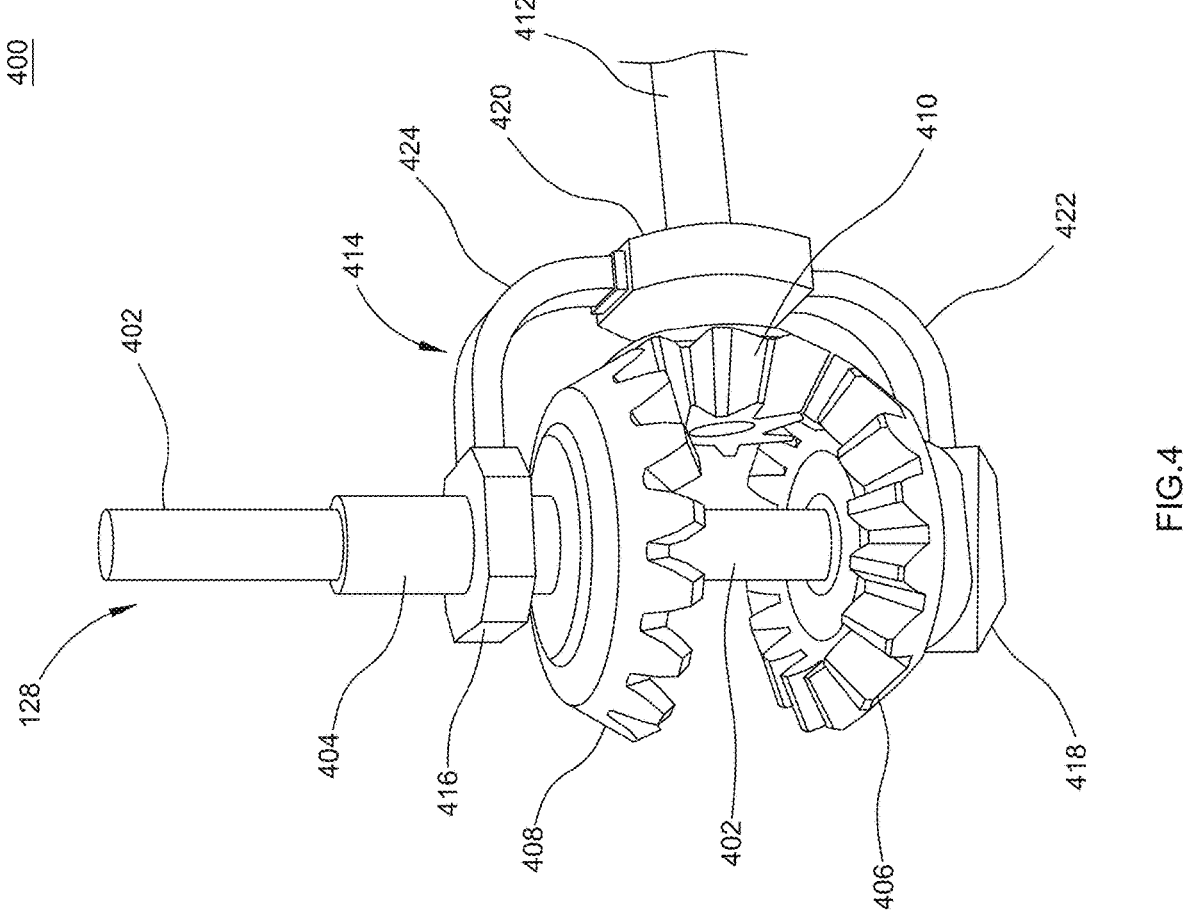
FIG. 4 shows a gearing arrangement for counterrotating coaxial shafts for use in an apparatus for converting rotational motion to linear motion, in accordance with some embodiments.

FIG. 4 shows a gearing arrangement 400 for counterrotating coaxial shafts for use in an apparatus for converting rotational motion to linear motion, in accordance with some embodiments. The gearing 400 can be part of the shaft assembly 128, and used to drive the two counter-rotating shaft portions at equal rates. The shaft assembly 128 can include an upper shaft portion 402 and a lower shaft portion 404. The upper shaft portion 402 passes through the lower shaft portion 404, and the two shaft portions 402, 404 are coaxial. The upper shaft portion 402 extends above the lower shaft portion 404, and there can be bearings between the shaft portion 402, 404, or sufficient lubrication can be used to maintain a fluid barrier between the two shaft portion 402, 404. Referring briefly back to FIGS. 1-3, arm 120 can be mounted on the lower shaft portion 404, and arm 124 can be mounted on the upper shaft portion 402, and only the upper and lower shaft portions 402, 404 can extend out of the generator platform 116 while the rest of the gearing arrangement is inside the generator platform 116.

The gearing arrangement 400 includes a first bevel gear 406 axially mounted on the upper shaft portion 402 and a lower end of the upper shaft portion 402. A second bevel gear 408 is axially mounted on the lower shaft member 404 at a lower end of the lower shaft member 404. The upper shaft member 402 passes through both the lower shaft member 404 and the second bevel gear 408. The two bevel gears 406, 408 face each other and are separated apart from each other so that they can both enmesh with a pinion bevel gear 410 that is mounted perpendicularly to the planes of the first and second bevel gears 406, 408. The pinion bevel gear 410 can be axially coupled to a drive shaft 412. When an internal drive source is used (e.g. an electric motor) it can be coupled to the drive shaft 412. When an external drive source is used, and coupled to the upper shaft portion 402, the drive shaft 412 can be decoupled from any internal drive source.

The gearing assembly 400 is held together by a gear frame 414 that includes a lower shaft guide 416, a drive shaft guide 420, and a shaft bearing 418. The lower shaft guide 416 holds the lower shaft portion 404, which passes through the lower shaft guide 416. The lower shaft guide 416, in addition to maintaining the position of the lower shaft 404, can also provide bearing support against the second bevel gear 408 to ensure that it remains enmeshed with the pinion gear 410. The shaft bearing 418 provides support for the upper shaft portion 402 and first bevel gear 406 by providing a bearing against which the first bevel gear 406, and thereby the upper shaft portion 402 can turn. A lower gear frame portion 422 rigidly couples the shaft bearing 418 to the drive shaft guide, and an upper gear frame portion 424 rigidly couples the lower shaft guide 416 to the drive shaft guide 420. When the pinion gear is driven by the drive shaft 412, as it rotates it causes the first bevel gear 406 and the second bevel gear 408, and thereby the upper shaft portion 402 and the lower shaft portion 404, to rotate in opposite directions. When the drive is provided to the upper shaft portion 402, the drive is transferred through from the first bevel gear 406 through the pinion gear 410 to the second bevel gear 408, causing the lower shaft portion 404 to rotate in correspondence. In fact, in some embodiments using internal drive, the drive shaft 412 can be omitted, and the drive provided through shaft guide where the shaft bearing 418 is located. The gearing arrangement 400 can be rigidly mounted in the generation platform 116 along with an electric motor. Other equivalent drive arrangements will occur those skilled in the art.

Figure 5:
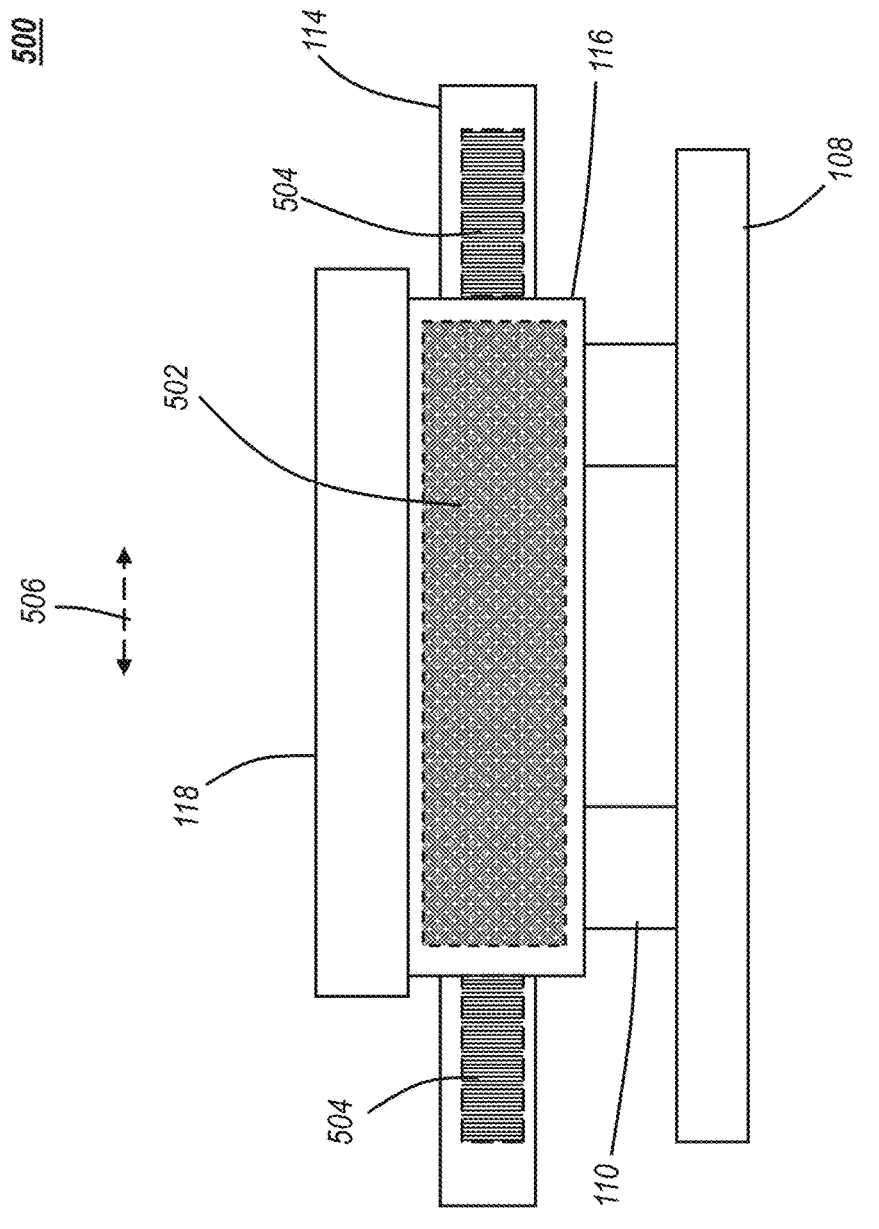
FIG. 5 shows a side view of an apparatus for converting rotational motion to linear motion with particular detail on an electromagnetic dampening system, in accordance with some embodiments.
Figure 5:

FIG. 5 shows a side view of an apparatus 500 for converting rotational motion to linear motion, with particular detail on an electromagnetic dampening system, in accordance with some embodiments. The generator platform 116 can contain a pair of magnets 502. Each magnet 502 can be cylindrical, or made up in the aggregate of magnets that form a cylindrical shape to surround a respectively one of the rails 112, 116. The rails 112, 114 each contain an electromagnetic coil 504 (or simply, a coil). The coil 504 is a winding of conductive wire and is also arranged substantially in s cylindrical form factor. The opposite ends of each coil are connected to opposite inputs to an electric circuit. The electric circuit can include, for example, a battery for storing charge, instruments for measuring electrical parameters, and/or a load that causes resistance to the flow of electricity. As the generating platform 116 reciprocates on the rails 112, 114, as indicated by arrow 506, the magnetic field of the magnets 502 moving around the coil 504 induces a corresponding time-varying electric voltage across the coil 504 that is output in whatever circuit to which the coil is connected. The movement of the generator platform 116 can be dampened by providing a load that is coupled to the output of the coil 504 which resists the flow of current, thereby increasing the voltage output by the coil, which creates resistance to the movement of the magnet 502. The load can be time varying, as well, and it can vary with the position of the generating platform 116 over the course of its reciprocation. For example, the load can be dynamically varied to allow the generator platform 116 to move more freely during the middle of its reciprocation, and the load can be increased as it approaches each apex of its reciprocation, effectively braking the movement of the generating platform 116.

It will be appreciated by those skilled in the art that the particular form of the linear generator can vary. The linear generator shown in FIG. 5 is one example of a linear generator, and other forms of linear generators can be used equivalently. For example, it is contemplated that instead of a tubular coil, a pair of flat coils with a flat iron or ferromagnetic metal plate oscillating between the flat coils could be used.

Figure 6:
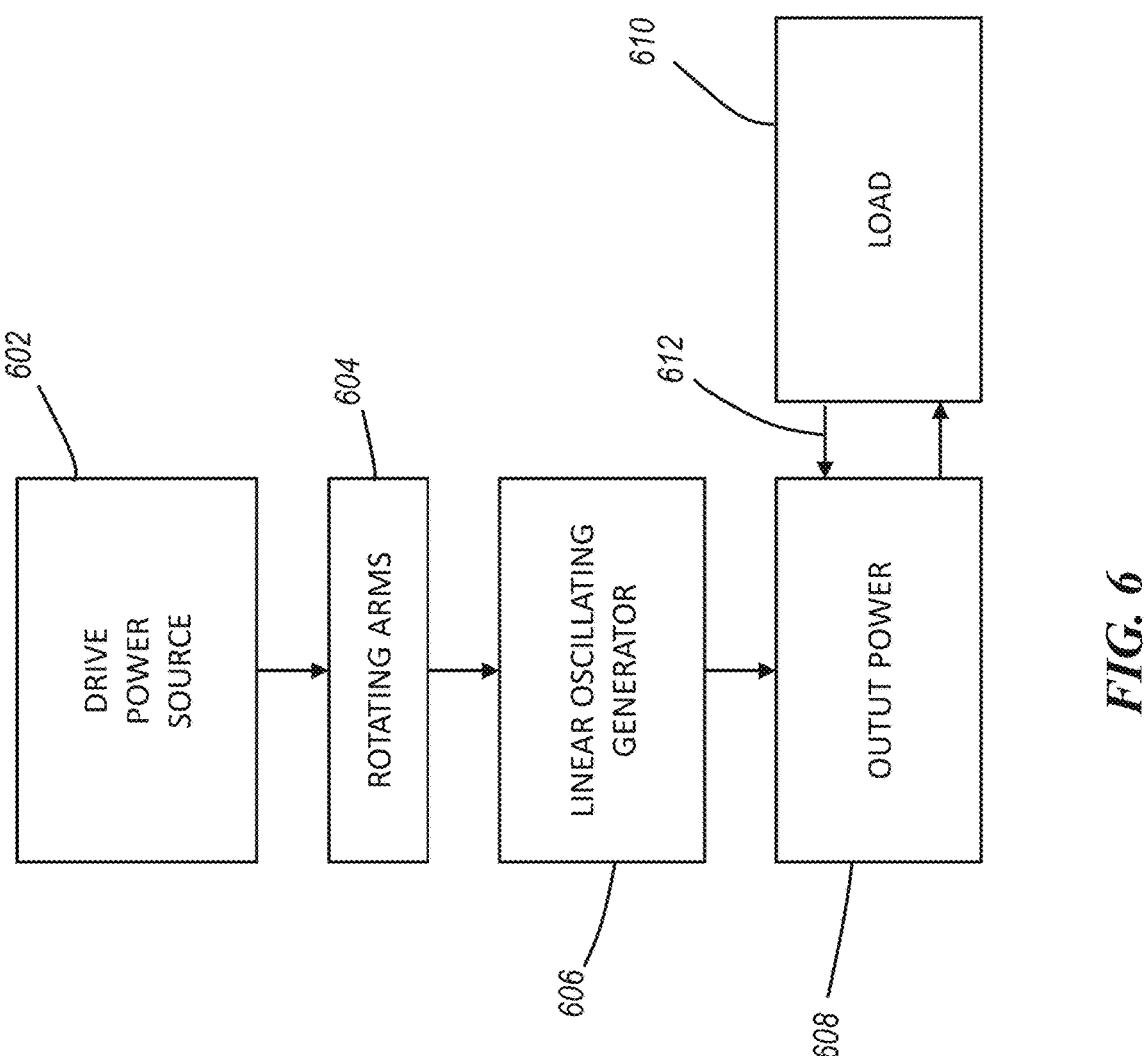
FIG. 6 shows a block diagram of power conversion by an apparatus for converting rotational motion to linear motion, in accordance with some embodiments.

FIG. 6 shows a block diagram 600 of power conversion by an apparatus for converting rotational motion to linear motion, in accordance with some embodiments. As one application of the inventive apparatus, the efficiency of power conversion where power to rotate the arms 120, 124 is converted to linear reciprocation and to generate power through the linear reciprocation as described in reference to FIG. 5. A drive power source 602 is provided to rotate the arms 120, 124. This power source 602 can be an internal power source, such as a motor, or an external power source. In either case, the power source 602 provides the rotational drive to turn the upper and lower shaft portions 402, 404 through the gearing arrangement 400, causing the arms 120, 124 to rotate 604. As the arms 120, 124 rotate, they induce a linear motion response in the generating platform which interacts with the coils in the rails to act as a linear oscillating generator 606. The output 608 of the coil(s) is provided to a load 610, which can dampen the motion of the generating platform by providing resistance 612.

Figure 7:
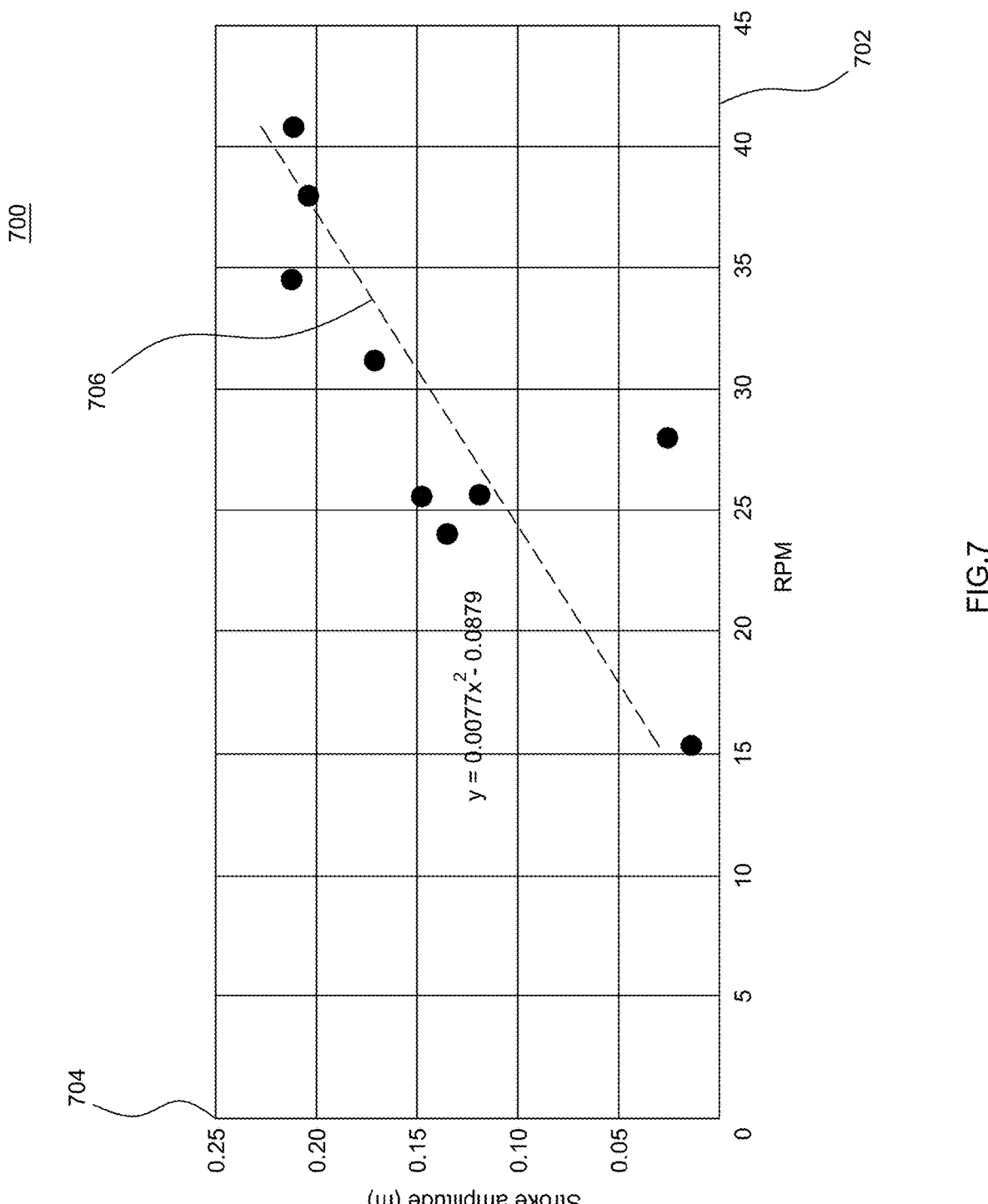
FIG. 7 shows an exemplary graph chart of linear displacement versus rotational speed for an apparatus for converting rotational motion to linear motion, in accordance with some embodiments.

FIG. 7 shows an exemplary graph chart 700 of linear displacement versus rotational speed for an apparatus for converting rotational motion to linear motion, in accordance with some embodiments. In one example, an apparatus was built and tested to produce the chart 700. The horizontal axis 702 indicated rotational speed in revolutions per minute and vertical axis 704 indicates the linear displacement, or length or reciprocation of the generating platform. As can be seen, the linear displacement increases roughly linearly with the rate of rotation 702 for at least a range of revolution rate. It is expected that this trend would decrease beyond some rate, and the displacement could even decrease. As with any system, there is a resonant point or points where the system responds at a maximum output. That means there is a revolution rate at which the linear displacement is maximized, and above and below that rate the linear displacement is reduced.

Figure 8:
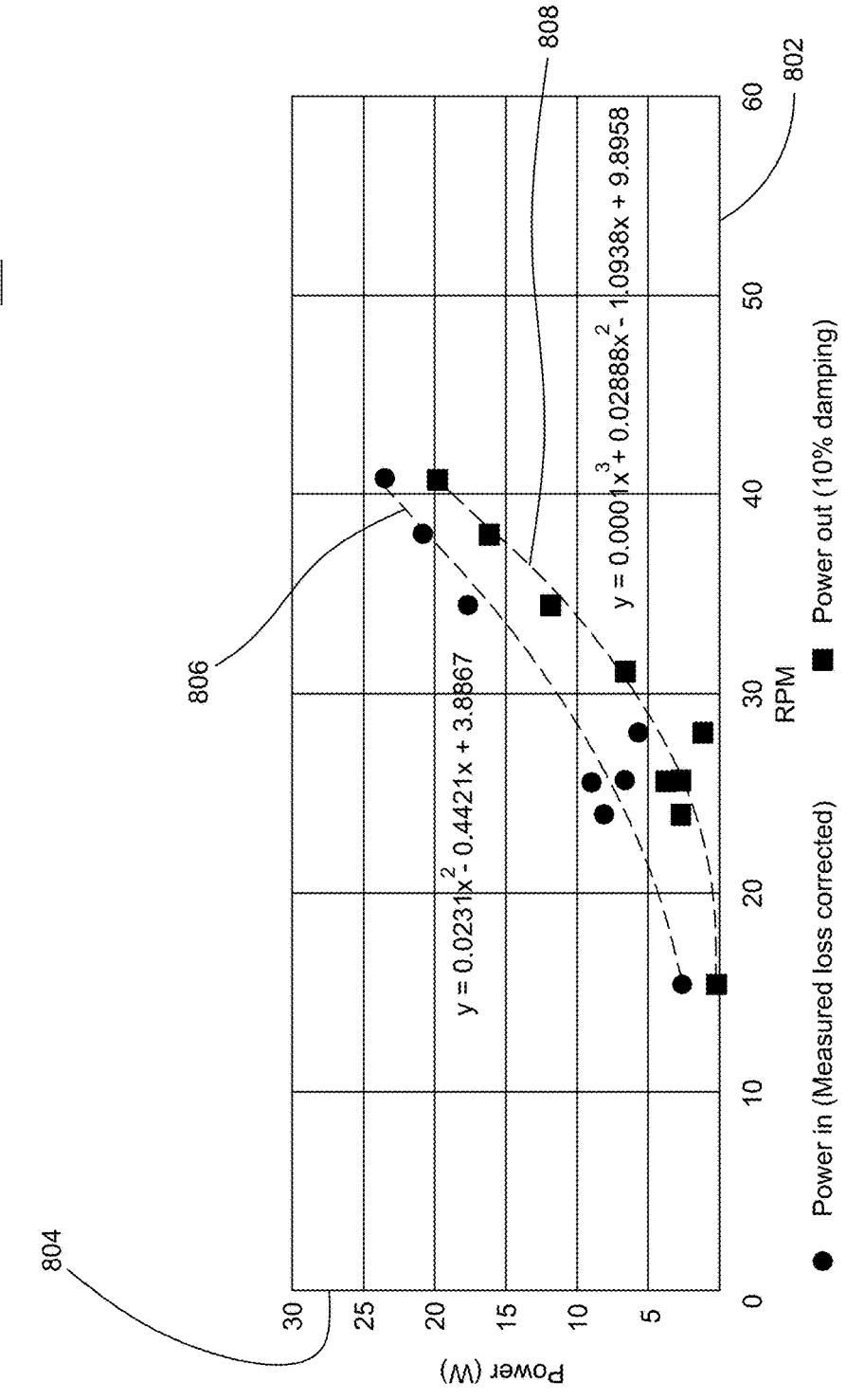
FIG. 8 shows an exemplary graph chart of power conversion efficiency versus rotational speed for an apparatus for converting rotational motion to linear motion, in accordance with some embodiments.

Similarly, in FIG. 8, an exemplary graph chart 800 of power conversion efficiency versus rotational speed for an apparatus for converting rotational motion to linear motion is shown. Both input power 806 and output power 808 are charted on the vertical axis 804 as a function of revolution rate along the horizontal axis 802. The input power 806 is the power used to drive revolution of the arms, and output power 808 is the power output by the linear generator. In the present example some damping was applied. The gap between the input power 806 and the output power 808 indicates losses in the conversion, allowing an efficiency to be calculated.

Figure 9:
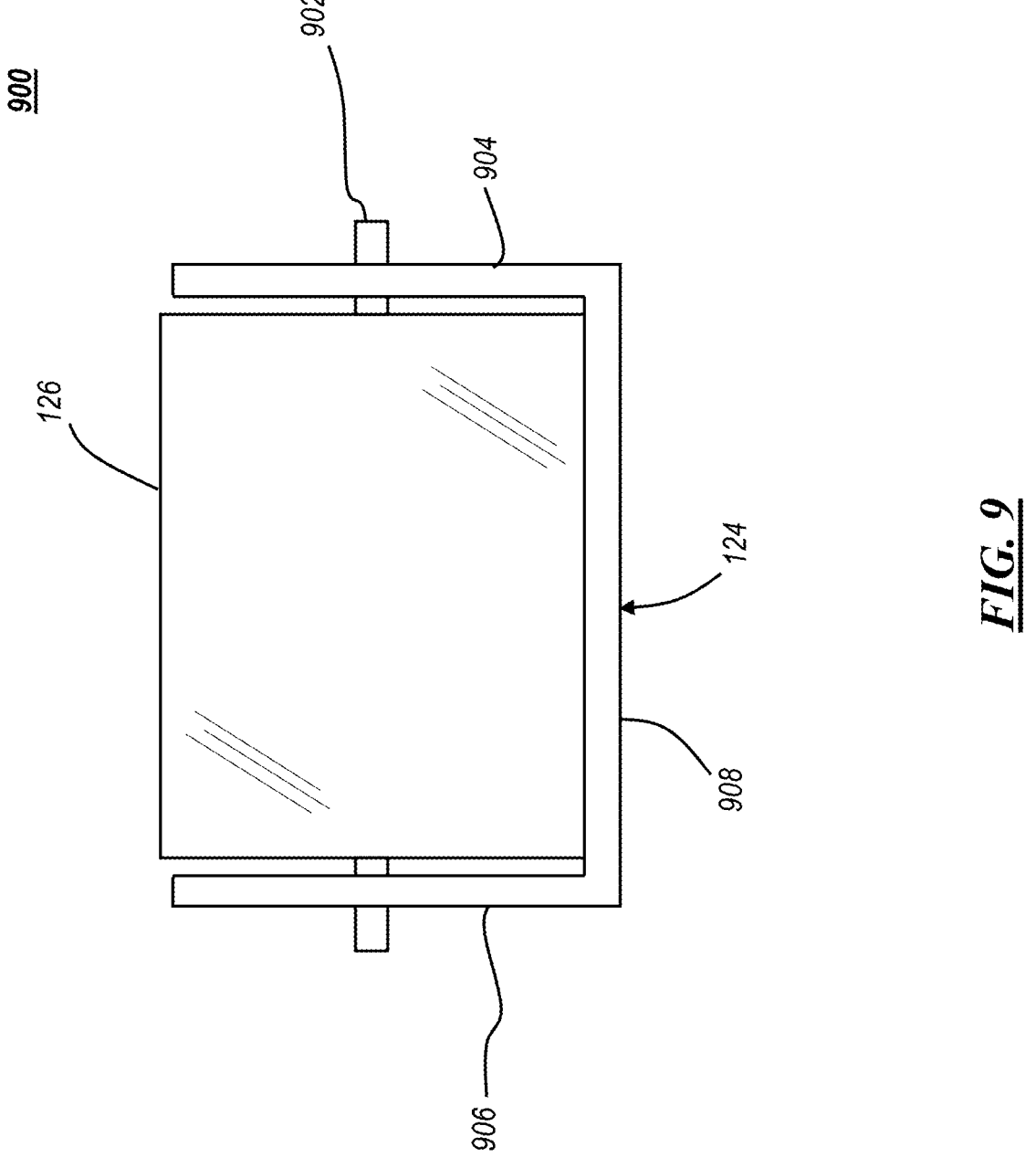
FIG. 9 shows an end view of a rotating arm, including a variable position mass, for an apparatus for converting rotational motion to linear motion, in accordance with some embodiments.
Figure 10:
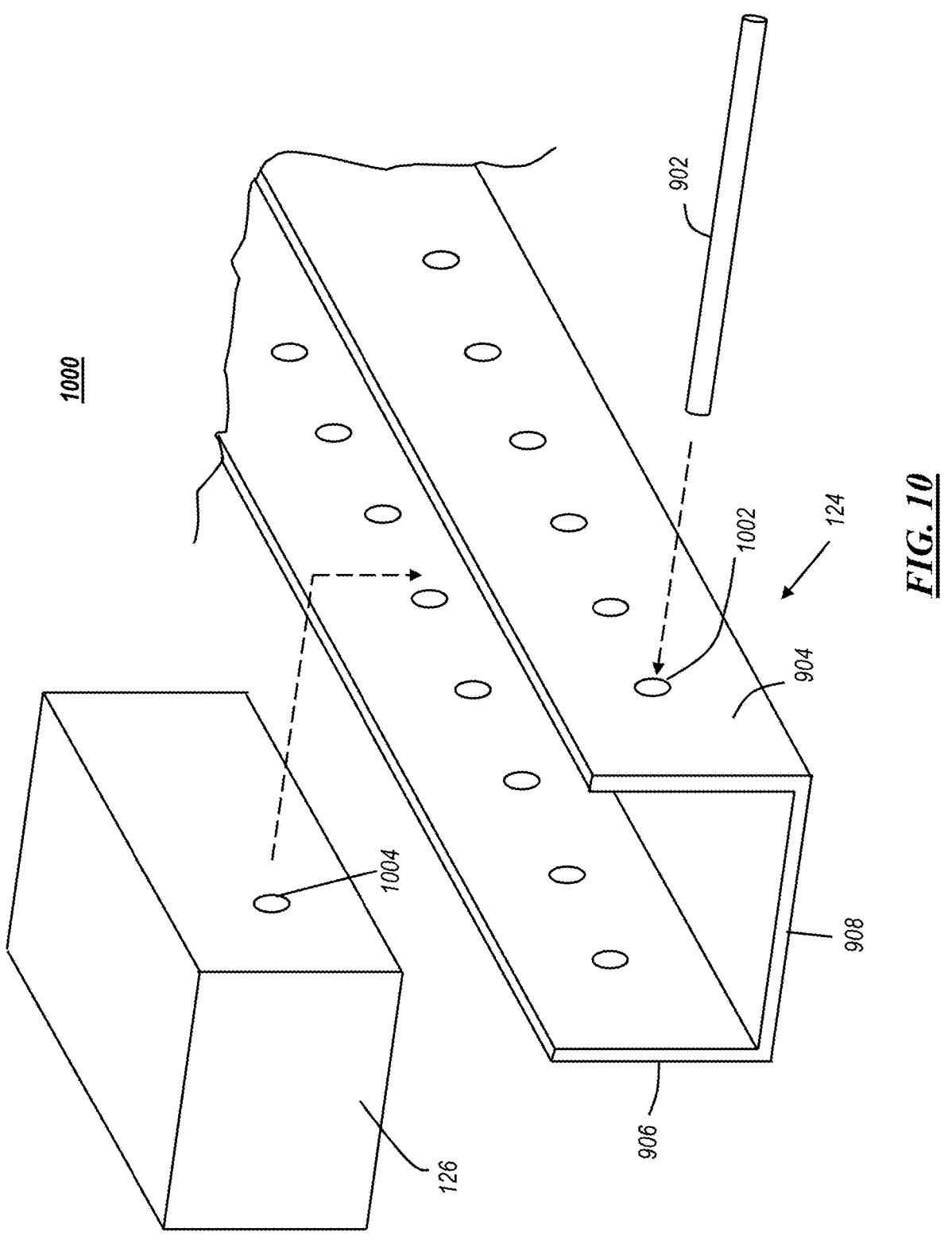
FIG. 10 shows a perspective exploded view of a rotating arm, including a variable position mass, for an apparatus for converting rotational motion to linear motion, in accordance with some embodiments.
Figure 11:
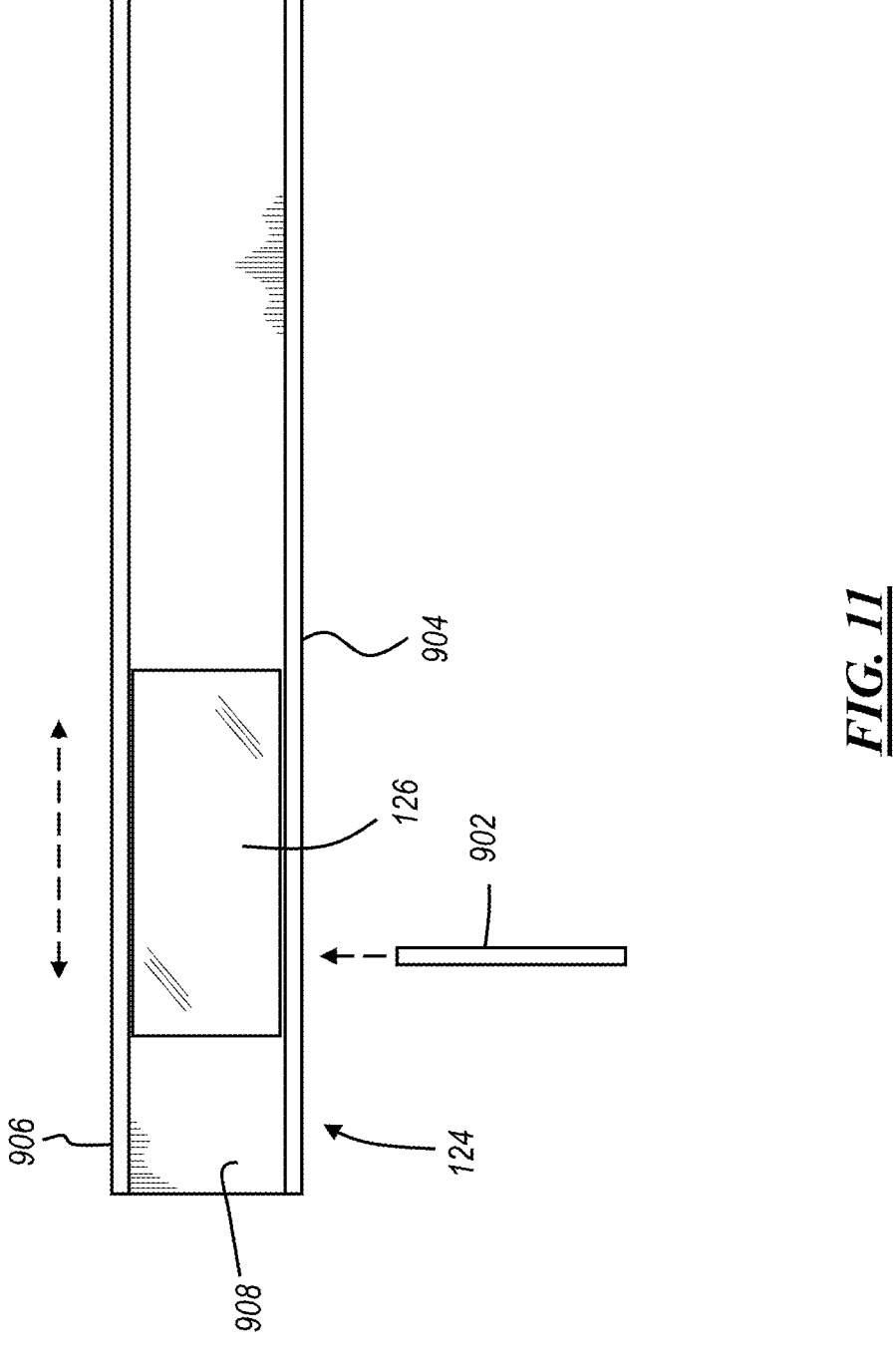
FIG. 11 shows a top plan view of a rotating arm, including a variable position mass, for an apparatus for converting rotational motion to linear motion, in accordance with some embodiments.

FIGS. 9-11 show various views of one of the arms 124 and a mass 126 that is mounted on the arm to tune the force generated by rotating the arm 124. FIG. 9 show an end view, FIG. 10 shows a perspective exploded view, and FIG. 11 shows a top plan view of the rotating arm, including a variable position mass, for an apparatus for converting rotational motion to linear motion, in accordance with some embodiments. The arm 124 can be configured in a variety of shapes to allow the mass 126 to be affixed at a selected point along the arm 124. One simple means for accomplishing this is to provide the arm 124 with a pair of opposing walls 904, 906 on the sides of a floor 908, creating a "U" shape in which the mass 126 can site. The mass 126 rests on the floor 908, between the walls 904, 906. The walls 904, 906 have a series of holes 1002 that are positioned along the length of the arm 124 are regular positions. The mass 126 likewise has a bore 1004 through the mass 126. A pin 902 can pass through the walls 904, 906 and the mass 126, thereby securing the mass in the arm 124. The arm 124 can be made of a rigid material, such as metal. For example, the arm 124 can be made of extruded aluminum, and the pin 902 can likewise be made of a sufficiently strong and rigid material to hold the mass 126 in place. Additional pins may also be used, duplicating bore 1004 and pin 902.

Figure 12B:
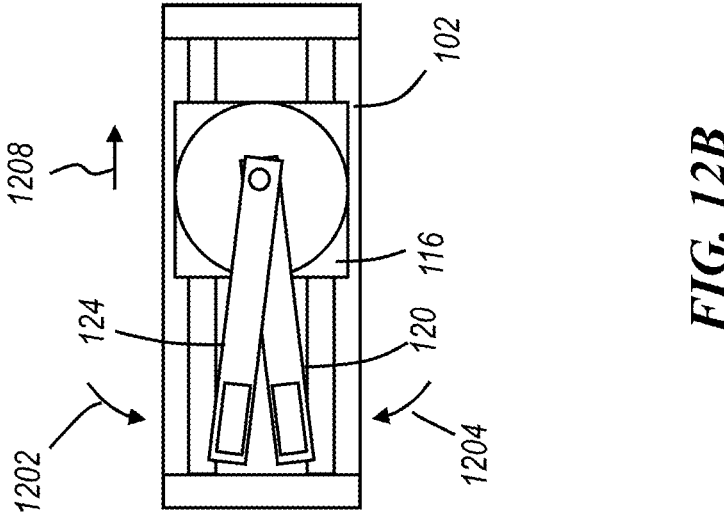
FIGS. 12A and 12B show the linear displacement position relative to rotational position of an apparatus for converting rotational motion to linear motion, in accordance with some embodiments.
Figure 12A:
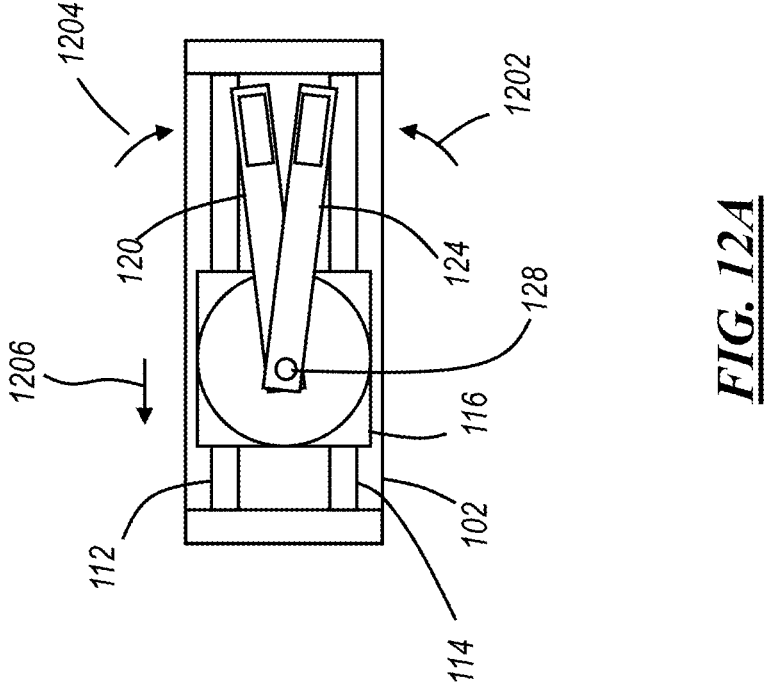
Figure 12C:
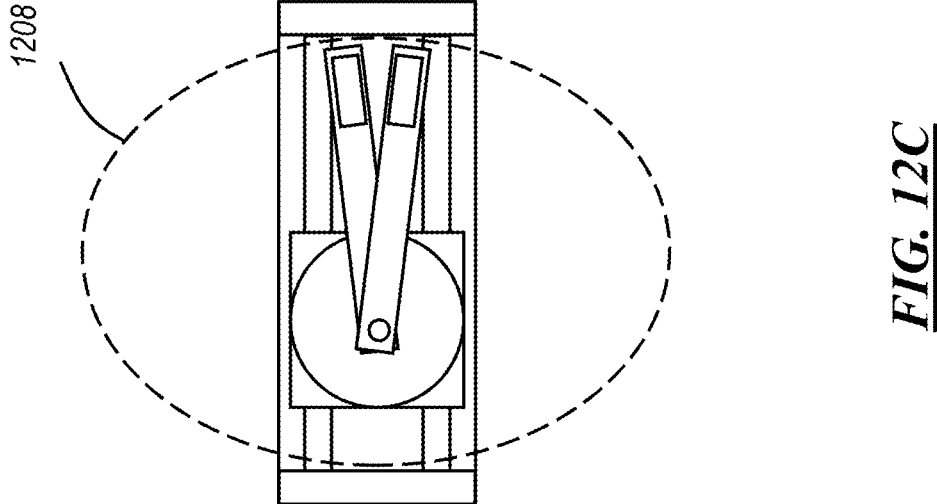
FIG. 12C shows the path of the end of the arms of the apparatus during operation, in accordance with some embodiments.

FIGS. 12A and 12B show the linear displacement position relative to rotational position of an apparatus for converting rotational motion to linear motion, in accordance with some embodiments. The two views show the apparatus 100 from a top plan view during operation, with the arms one half of a rotation different. That is, from FIG. 12A to FIG. 12B, the arms 120, 124 have moved one half of a full rotation around the shaft assembly 128. Arm 120 is rotating in a clockwise direction as indicated by arrow 1204, and arm 124 is rotating in a counter-clockwise direction, as indicated by arrow 1202. The inertia of the masses on the arms, and of the arms themselves, resist movement, and as a result, the generator platform 116 moves as well, along the rails 112, 114, as indicated by arrow 1206. In general, when the distal ends of the arms 120, 124 are at their right-most position, the generator platform 116 will be at its left-most position. In FIG. 12B, the arms 120, 124 have rotate a half rotation about the shaft assembly 128, and when the distal ends of the arms 120, 124 are then at their left-most position, then the generator platform 116 will be at its right-most position. Given that the shaft assembly 128 reciprocates with the generator platform, the arms 120, 124 do not follow a circular path as they are rotated. Rather, the path is more akin to a stretched circle 1208 as shown in FIG. 12C.

The claims appended hereto are meant to cover all modifications and changes within the scope and spirit of the present invention.

What is claimed is:

1. An apparatus for converting rotation motion to linear motion, comprising:

a base having a pair of rails that are parallel to each other, a longitudinal axis defined midway between the rails and parallel to the rails;

a platform mounted on the pair of rails and configured to roll freely along the pair of rails;

a coaxial shaft extending from the platform centered over the longitudinal axis, and having a first portion that rotates in a first direction and a second portion that extends above the first portion that rotates in a second direction that is opposite of the first direction;

a first boom coupled to the first portion of the coaxial shaft and having a first boom mass;

a second boom coupled to the second portion of the coaxial shaft and having a second boom mass; and wherein, upon applying a rotational drive to the coaxial shaft, the first boom is rotated about the coaxial shaft in the first direction and the second boom is rotated about the coaxial shaft in the second direction in synchronization such that rotation of the first boom and rotation of the second boom meet on the longitudinal axis, and wherein rotation of the first and second booms causes linear oscillation of the platform on the pair of rails.

2. The apparatus of claim 1, further comprising:

at least one electromagnetic coil mounted on the base; and a magnet mounted on the platform in proximity to the at least one electromagnetic coil, wherein the linear oscillation of the platform thereby induces an electric voltage in the at least one electro magnetic coil.

3. The apparatus of claim 2, wherein the at least one electromagnetic coil comprises a flat electromagnetic coil.

4. The apparatus of claim 1, wherein the coaxial shaft is configured to couple to an external rotational drive source to receive the rotational drive.

5. The apparatus of claim 1, wherein the platform further includes a motor that is coupled to the coaxial shaft to provide the rotational drive.

6. The apparatus of claim 1, wherein each of the first boom and the second boom comprise a block mass that can be positioned and fixed along each of the first boom and second boom at selected distances from the coaxial shaft, respectively.

7. The apparatus of claim 1, further comprising, at each of a first end and a second end of each rail of the pair of rails, there is a stop block.

8. An apparatus for converting rotation motion to linear motion, comprising:

a base having a pair of rails that are parallel to each other, a longitudinal axis defined midway between the rails and parallel to the rails;

a platform mounted on the pair of rails and configured to roll freely along the pair of rails;

a coaxial shaft extending from the platform centered over the longitudinal axis, and having a first portion that rotates in a first direction and a second portion that extends above the first portion that rotates in a second direction that is opposite of the first direction;

a first rotating member coupled to the first portion of the coaxial shaft and having a center of mass located a radial distance from the coaxial shaft;

a second rotating member coupled to the second portion of the coaxial shaft and having a center of mass located the radial distance from the coaxial shaft; and wherein, when a rotational drive is applied to the coaxial shaft the first rotating member rotates in the first direction about the coaxial shaft and the second rotational member rotates in the second direction about the coaxial shaft, and wherein rotation of the first rotating member in the first direction and rotation of the second rotating member in the second direction generate centripetal forces that sum in a direction along the longitudinal axis and cancel each other in a direction perpendicular to the longitudinal axis, there causing reciprocal oscillation of the platform along the pair of rails.

9. The apparatus of claim 8, wherein the first rotating member is a first boom that extends radially from the coaxial shaft, and the second rotating member is a second boom that extends radially from the coaxial shaft.

10. The apparatus of claim 9, wherein each of the first boom and the second boom comprise a block mass that can be positioned and fixed along each of the first boom and second boom at selected distances from the coaxial shaft, respectively.

11. The apparatus of claim 8, further comprising:

at least one electromagnetic coil mounted on the base; and a magnet mounted on the platform in proximity to the at least one electromagnetic coil, wherein the reciprocal oscillation of the platform thereby induces an electric voltage in the at least one electromagnetic coil.

12. The apparatus of claim 11, wherein the at least one electromagnetic coil comprises a flat electromagnetic coil.

13. The apparatus of claim 8, wherein the coaxial shaft is configured to couple to an external rotational drive source to receive the rotational drive.

14. The apparatus of claim 8, wherein the platform further includes a motor that is coupled to the coaxial shaft to provide the rotational drive.

15. A method of operating an apparatus for converting rotation motion to linear motion, comprising:

providing a base having a pair of rails that are parallel to each other that define a longitudinal axis midway between the rails and parallel to the rails;

providing a platform mounted on the pair of rails and configured to roll freely along the pair of rails;

providing a coaxial shaft extending from the platform centered over the longitudinal axis, and having a first portion that rotates in a first direction and a second portion that extends above the first portion that rotates in a second direction that is opposite of the first direction;

providing a first rotating member coupled to the first portion of the coaxial shaft and having a center of mass located a radial distance from the coaxial shaft;

providing a second rotating member coupled to the second portion of the coaxial shaft and having a center of mass located the radial distance from the coaxial shaft; and providing a rotational force to the coaxial shaft, thereby causing the first rotational member to rotate about the coaxial shaft in the first direction, and causing the second rotational member to rotate in the second direction; and responsive to providing the rotational force, the first rotational member and the second rotational member together generating centripetal forces that sum in a direction along the longitudinal axis and cancel each other in a direction perpendicular to the longitudinal axis, thereby causing the platform to reciprocate along the pair of rails.

\* \* \* \* \*